United States Patent [19]

Chung

[11] Patent Number: 4,878,401

[45] Date of Patent: Nov. 7, 1989

[54] COMBINATION ACCESSORY DRIVE AND SPEED REDUCER

[76] Inventor: Jackson Chung, 29A Sugar Creek Villas, Greer, S.C. 29650

[21] Appl. No.: 239,928

[22] Filed: Sep. 2, 1988

[51] Int. Cl.$^4$ .......................... F16H 3/44; F16H 57/10
[52] U.S. Cl. ................................ 74/781 R; 74/752 D
[58] Field of Search ............................ 74/78 R, 752 D

[56] References Cited

U.S. PATENT DOCUMENTS

| | | | |
|---|---|---|---|
| 1,118,616 | 11/1914 | Apple | 74/781 R |
| 1,781,925 | 11/1930 | Johnson | 74/781 R X |
| 2,153,856 | 4/1939 | Weydell | 74/781 R |
| 2,593,804 | 4/1952 | Schott | 74/781 R X |
| 3,038,354 | 6/1962 | Bernard | 74/752 D |
| 3,108,494 | 10/1963 | Kell | 74/781 R X |
| 3,501,980 | 3/1970 | Arick | 74/781 R |
| 4,625,587 | 12/1986 | Hosono | 74/781 R X |
| 4,644,824 | 2/1987 | Shimizu | 74/781 R |
| 4,663,989 | 5/1987 | Brodbeck | 74/781 R |
| 4,730,516 | 3/1988 | Kaneyuki | 74/752 D |

Primary Examiner—Dirk Wright
Attorney, Agent, or Firm—Cort Flint

[57] ABSTRACT

In combination with a conventional vehicle accessory drive pulley directly mounted and driven by a crankshaft 10 an epicyclic gear speed reducer set (F) is assembled as a unit A which comprises input and reaction sun gears (B,C). A combination planet carrier and drive casing (D) carries a plurality of compound planets (40,42), and an idler gear (43). Drive casing (D) of the assembly includes an integral pulley (34). Locking the reaction sun gear (C) to the carrier drive casing (D) produces a direct drive between the crankshaft and accessory. Braking the reaction sun gear to the engine frame (58), will switch the pulley assembly from direct drive to a reduction drive. This is accomplished automatically at a predetermined vehicle speed.

20 Claims, 3 Drawing Sheets

COMBINATION ACCESSORY DRIVE AND SPEED REDUCER

BACKGROUND OF THE INVENTION

The invention relates to driving of accessories of an combustion engine, particularly an automobile internal combustion engine, using a combination pulley and speed reducer for increased efficiency and economy of engine operation.

The emphasis on conservation of energy has accelerated the development of higher fuel efficient automobile engines. Substantial waste exists in the accessory drive. Conventional accessories such as the air conditioner, power steering, alternator, and water pump,etc., are driven directly off the crankshaft which runs through a wide range of speeds. Accessories are designed to perform when the engine is idling. When the vehicle is running at cruising speed, the engine will run several times its idling speed and so will the accessories driven by it. Proportionally substantial power is wasted as engine speed increases, especially in highway driving. Therefore, saving this wasted power becomes a problem to which increased attention needs to be given.

Prior devices have been proposed for altering the speed ratio of a crankshaft of an internal combustion engine to an associated accessory drive. For example, U.S. Pat. Nos. 4,706,520; 4,653,349; 4,305,488; 4,265,135; 3,108,494 and 2,153,856 all disclose different devices for altering the speed of vehicle accessory drives. U.S. Pat. No. 4,706,520 uses a planetary gear train and a cone clutch which selectively engages a ring gear of the gear train to provide a direct drive, or underdrive or overdrive. U.S. Pat. No. 4,653,349 discloses a cone drive and engagable speed change ring which causes a desired ratio between crankshaft and accessory drive speeds. U.S. Pat. No. 4,265,135 discloses a complicated arrangement of a planetary gear train including ring gear, friction brake, friction clutch, and hydraulic system to provide a direct drive, constant speed drive, and high variable speed drive. U.S. Pat. No. 4,305,488 discloses a speed reducing planetary gear train in which a flywheel is clutched to the ring gear so that the flywheel overruns the ring gear when the vehicle is braked to drive the vehicle accessories even when the vehicle is stopped. U.S. Pat. No. 2,153,856 discloses a gear set for reducing the speed ratio of a vehicle accessory drive wherein different diameter sun gears are clutched together with ratchet teeth for a direct drive. While the above are illustrative of various and diverse proposals for solving the problem of inefficient vehicle accessory drives, they are not entirely satisfactory because of the complexity of the devices, lack of interchangeability with the conventional crankshaft pulley arrangement and accessory drives, unsuitability for reliable actuation in response to speed conditions, and other reasons that will become apparent from an understanding of the advantages of the present invention.

Speed reducing devices are known in many industrial applications. The inventor of the present invention has been issued U.S. Pat. Nos. 3,122,945 and 4,189,962 related to industrial applications, and U.S. Pat. No. 4,056,018 relating to a speed reducer for a heavy-duty vehicle wheel drive typically used in off-road equipment. Industrial speed reducing drives have not been utilized effectively in the motor vehicle field for many reasons. The main power transmission drive of a motor vehicle is too complex and different, particularly the manually clutched transmission, to be germane. The accessory drives of motor vehicles have quite different input and output arrangements and requirements, not to mention the rigorous environments of combustion engine drives and vehicular use. Industrial applications typically use variable speed electric motors and a single gear ratio reducer to obtain variable speed drives and reduction. The above noted U.S. Pat. No. 3,122,945 relates to an epicyclic gear arrangement having a pulley input driven by an electric motor in an industrial application for speed reduction, however, the arrangement is not suitable for motor vehicle use.

Accordingly an object of the present invention is to provide a variable speed accessory drive for an internal combustion engine which is simple and reliable in construction and operation.

Another object of the present invention is to provide a combination pulley and speed reducer which may be easily substituted for a conventional accessory drive pulley on a power crankshaft for varying the speed of the accessory drive.

Another object of the present invention is to provide a speed reducing drive for vehicle accessories which may be easily and reliably switched at a predetermined vehicle speed from direct drive to reduced drive and vice versa.

Still another object of the present invention is to provide a speed reducing gear train for coupling a vehicle crankshaft to an accessory drive which has a minimum of parts and may easily exchange the crankshaft and operate at direct and reduced drives.

SUMMARY OF THE INVENTION

The above objectives are accomplished according to the present invention by providing a combination pulley and speed reducer that can replace the conventional accessory drive pulley on a vehicle crankshaft without major body modification. Automatic switching is provided at a predetermined vehicle speed from direct drive to reduction and vice versa. The drive system comprises an epicyclic gear set having a first sun gear drivingly connected to the crankshaft and a second sun gear which is a reaction gear. A planet carrier forms a casing which provides an output. A plurality of compound planets are journaled in the planet carrier with suitable bearings to permit axial movement of planet in order to share loads of the gearing. The compound planet pinions are provided with helical gears of opposite angles. In a preferred embodiment of the invention, a caliper disc brake in conjunction with a conventional overrunning clutch are used. The over-running clutch will lock the reaction sun sleeve to the planet carrier, and the assembly becomes a direct drive. When the brake is applied to the reaction sleeve, the planet carrier is driven through the reduction gear, preferably at about 2 to 2.5 to 1 ratio. A vehicle speed sensor may be used to activate the brake. It is preferable to sense the speed of the vehicle rather than the engine speed to activate the brake since the speed change frequency of the vehicle is less than the engine. This will reduce the hunting operation of the brake.

DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
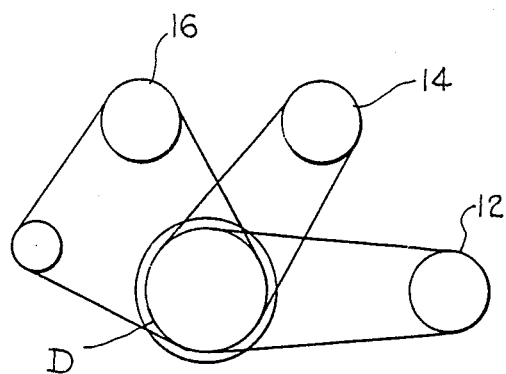
FIG. 1 is an elevation illustrating a variable speed accessory drive for an internal combustion engine according to the invention.
Figure 2:
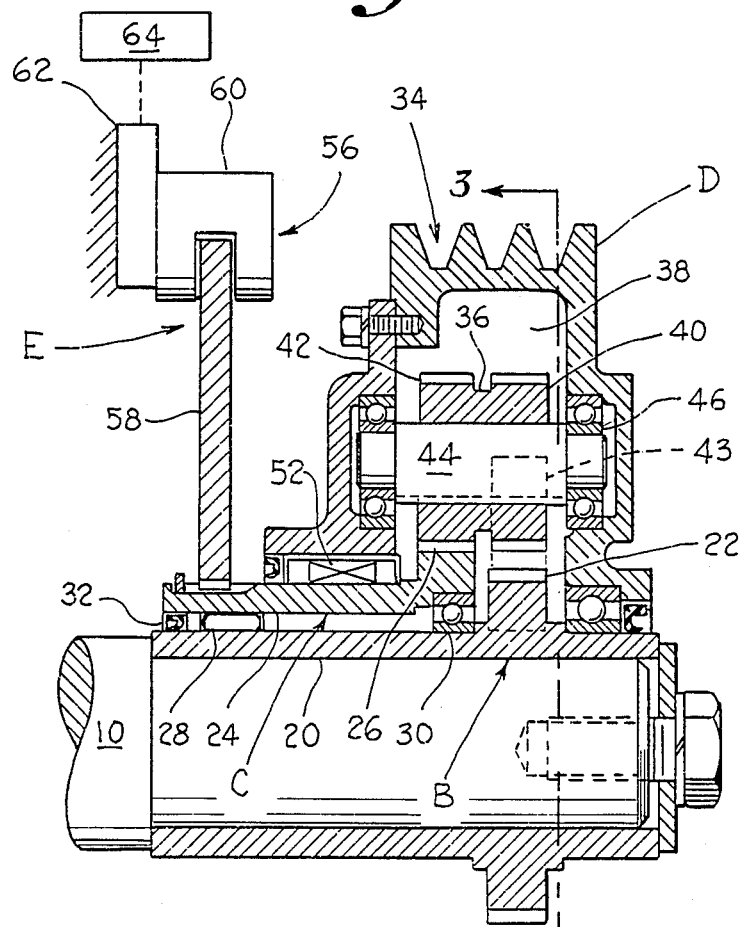
FIG. 2 is a perspective view of a combination accessory drive and speed reducer for an internal combustion engine according to the invention.
Figure 3:
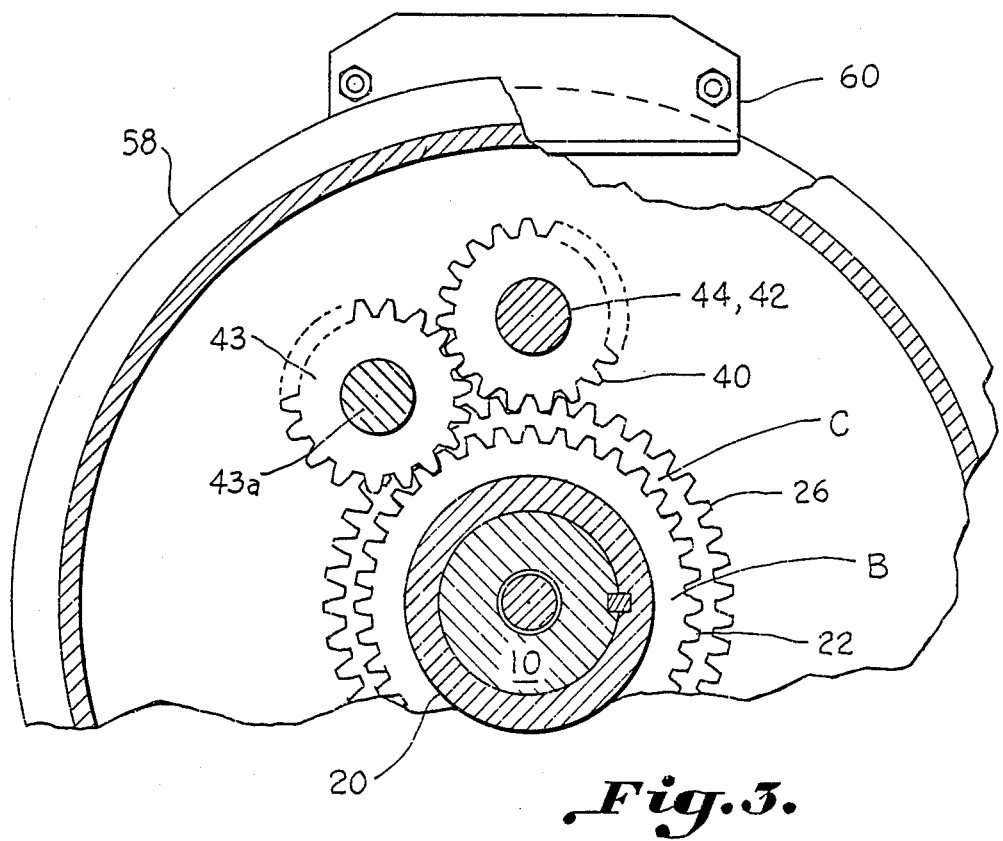
FIG. 3 is a partial sectional view taken along line 3—3 of FIG. 2.

Referring now in more detail to the drawings, a speed reducing accessory drive, designated generally at A, is illustrated for an automobile and the like having a crankshaft 10 and a number of accessories 12, 14, 16 which are driven by the crankshaft.

Accessory drive A includes an input sun gear B affixed to crankshaft for rotation with said crankshaft. For this purpose input gear B includes a sleeve 20 and gear teeth 22 at one end of the sleeve which may be keyed onto shaft 10. A reaction sun gear C is rotatably carried on crankshaft 10. Gear C includes a sleeve 24 and gear teeth 26 carried at one end of this sleeve. Gear C is rotatably carried by means of suitable bearings 30 between sleeve 20 and sleeve 24. A seal 32 is fitted between sleeves 20 and 24 at their ends.

A combination planet carrier and accessory drive casing D is carried on crankshaft 10 having external output means, designated generally as 34, for connecting to at least one of the accessories 12, 14, 16 to be driven by accessory drive casing D. A compound planet 36 is rotatably carried by casing D on an interior 38 of the casing. Compound planet 36 includes a first planet gear 40 being in constant mesh with an idler gear 43 which meshes with input sun gear B, and a second compound planet gear 42 being in constant mesh with reaction sun gear C. Idler gear 43 is carried on a shaft 43a by casing D and provides rotation of the gear set in a proper direction. Gears 40 and 42 are preferably helical gears with teeth lying at opposite angles and are one piece and are carried on a shaft 44 rotatably journaled in bearings 46 fixed in opposing sides of casing D. The above described drive arrangement forms an epicyclic gear train in which gear set means F ,comprising gears 40,42, and 43 which interconnect sun gears B and C, travels around the outside of gears B, C whose axis is fixed. There must be at least one compound planet gear or gear set F, but may also be a plurality of the compound planets and gear sets.

Actuation means, designated generally as E, is provided for locking input sun gear C and drive casing D together for direct crankshaft drive and for braking the reaction sun gear C to a stationary reference for reduced accessory drive speed through gear set F. Actuation means E includes a clutch means, designated generally as 52, for clutching the gear and casing together in a locked driving relation. The clutch means connects and disconnects reaction sun gear C to casing D to provide direct drive and reduced drive, respectively, between drive casing D and input sun gear B. Clutch means 52 preferably includes an over-running clutch, which may be of a conventional type such as an INA type HFL 2026, connected between an interior of axial hub 54 of casing D and reaction sun gear C. Actuation means E further includes a friction brake, designated generally as 56 for braking reaction sun gear C against a fixed surface 62 of the automobile. Friction brake 56 includes a brake disc 58 keyed on sleeve 24 of reaction sun gear C, and brake calipers 60 actuated mechanically, or by fluid. Control means 64 is provided for sensing a speed condition for actuating the actuation means and brake in response to the speed condition of the vehicle and reducing the accessory drive speed at that point. Control means 64 includes means for sensing the speed of the vehicle to activate the brake by conventional techniques such as electromagnetic means for activating the brake or fluid means for activating the brake.

Actuation means E thus may include brake 56 fixed to a stationary reference, a braked member in the form of disc 58 fixably carried by the reaction sun gear, and clutch 52. Overrunning clutch 52 connects reaction sun gear C and combination casing D together for creating a locked drive when the reaction sun gear rotates faster or equal to the speed of drive casing D and a freewheeling drive when the casing rotates faster than the reaction sun gear. i.e. the reaction gear is braked.

Preferably, output means 34 of drive casing D includes V-belt grooves 50 which receive drive belts 12a, 14a, 16a for driving the respective accessories 12, 14, 16. The outside circumference of casing D may also include gear teeth (not shown) for the output.

Figure 4:
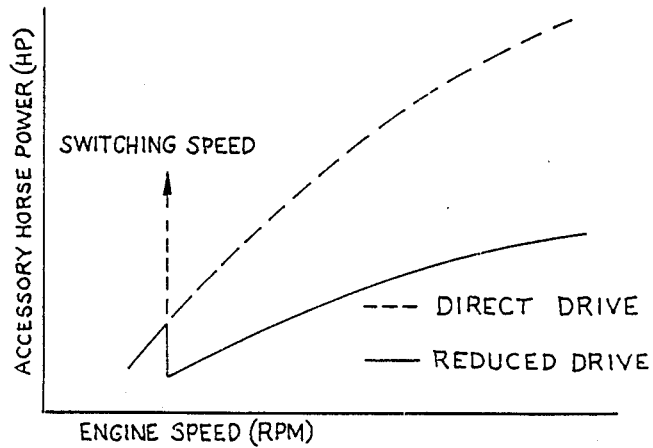
FIG. 4 is a graph illustrating speed of a variable speed accessory drive for an internal combustion engine according to invention.
Figure 5:
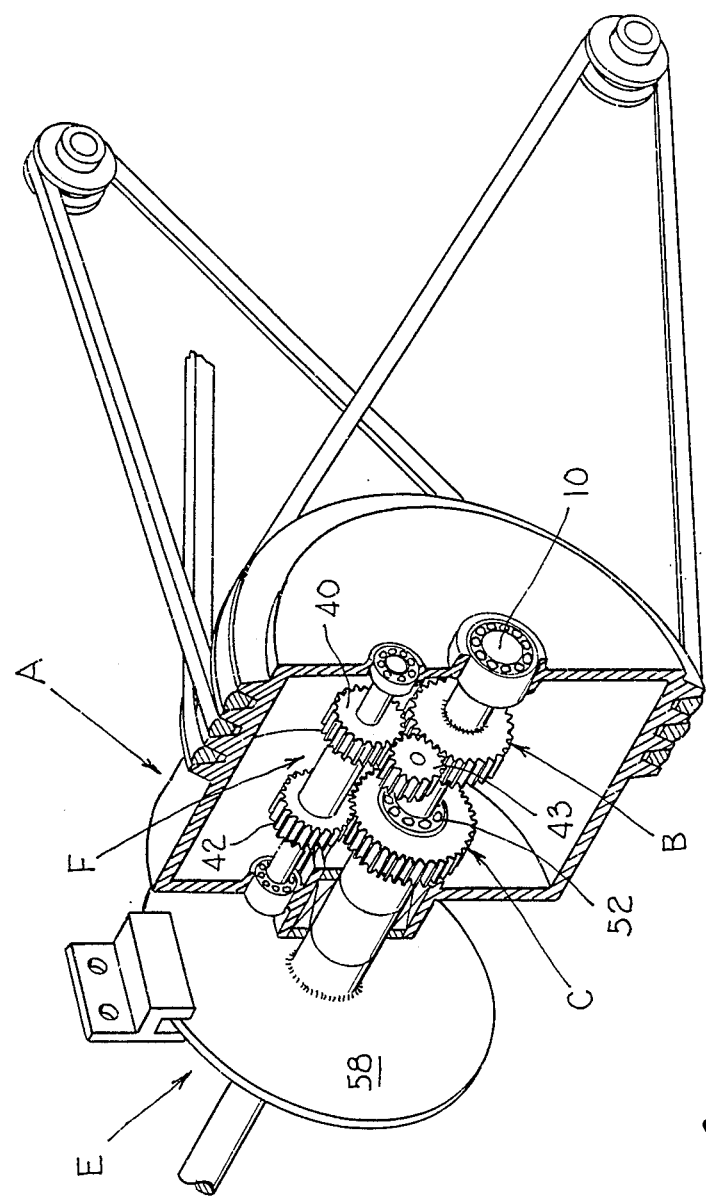
FIG. 5 is a simplified perspective view of a combination accessory drive and speed reducer according to the invention with part of a drive casing cut away.

In operation, as can best be seen in FIG. 5, as long as disk 58 is unbraked and reaction sleeve 24 is free, clutch 52 clutches reaction sun gear C and drive casing D together in a locked drive. Casing D ,reaction gear C, gear set F, input gear B ,and crankshaft 10 rotate together. As soon as disk 58 is braked by actuation means E, crankshaft 10 drives input gear B clockwise which drives planet gear 40 clockwise through intermediate idler gear 43. Planet gear 42 is driven clockwise with planet gear 40 and reacts against reaction/reduction sun gear C so that casing D rotates about gear C at a reduced speed relative to crankshaft 10. The reduced drive relationship is illustrated in the graph of FIG. 4.

EXAMPLE

The following is an example of a gear set for use in a combination pulley and speed reducer in accordance with the invention for purposes of illustration only and not limitation.

Sun Gear B -- 40 teeth
Sun Gear C -- 50 teeth
Planet Gear (40,42) -- 20 teeth
Idler Gear (43) -- 20 teeth
Casing D to Crankshaft 10 drive ratio -- 1.12.25

It will be noted that an advantage of the invention is that the combination accessory drive and speed reducer unit A may be placed on a conventional crankshaft with the conventional drive pulley removed. The invention may be used as an add on unit or as original equipment. Only minor modification is needed as a add on unit such as mounting of the brake calipers 60 to a fixed reference and minor mechanical work.

While a preferred embodiment of the invention has been described using specific terms, such description is for illustrative purposes only, and it is to be understood that changes and variations may be made without departing from the spirit or scope of the following claims.

What is claimed is:

1. A speed reducing accessory drive for an automobile and the like having a crankshaft and a number of accessories which are driven by said crankshaft comprising:

an input sun gear affixed to said crank shaft for rotation with said crankshaft;

a reaction sun gear rotatably carried on said crankshaft;

a combination planet-carrier/drive casing carried on said crankshaft, said drive casing having means for drivably connecting to at least one of said accessories to be driven by said drive casing;

drive means carried by said casing for driving said accessories;

at least one compound planet rotatably carried by said drive casing on an interior of said drive casing having a first planet gear driven by said input sun gear, and a second planet gear of said compound planet which drives said reaction sun gear; and actuation means for braking said reaction sun gear in a stationary position causing said drive casing to be driven through said compound planet at a prescribed reduced speed ratio to the speed of said crankshaft and in the same direction as said crankshaft, and for releasing said reaction sun gear to cause said drive casing, input sun gear, and input sun gear to rotate in unison with one another so that said drive casing is driven directly with said crankshaft drive.

2. The device of claim 1 wherein said drive means includes drive belt grooves around a circumference of said drive casing.

3. The device of claim 1 including clutch means for connecting said reaction sun gear to said drive casing to selectively connect said reaction sun gear and drive casing together for said direct drive and to disconnect said drive casing and said reaction sun gear for said reduced drive.

4. The device of claim 1 wherein said actuation means includes a friction brake for braking said reaction sun gear against a fixed reference frame of said automobile.

5. The device of claim 4 wherein said actuation means includes a clutch means having an over-running clutch connected between said drive casing and said reaction sun gear, and control means for controlling said actuation means.

6. The device of claim 4 wherein said control means includes means for sensing the speed of said vehicle to activate said brake.

7. The device of claim 6 wherein said control means includes electromagnetic means for activating said brake.

8. The device of claim 1 wherein said compound planet includes helical gears with teeth lying at opposite angles.

9. The device of claim 1 including an idler gear carried by said drive casing which meshes with said input sun gear and said first planet gear.

10. In a motor vehicle, the improvement comprising in combination an internal combustion engine having a crankshaft from which at least one accessory is driven, and a combination accessory drive and speed reducer carried on said crankshaft comprising:

an input sun gear fixed for rotation with said crankshaft;

a reaction sun gear carried for rotation relative to said crankshaft;

a combination gear carrier/drive casing having an exterior output drive for driving said accessory;

gear set means carried by said drive casing interconnecting said input sun gear and said reaction sun gear; and actuation means for locking said reaction sun gear and drive casing together to form a direct drive between said crankshaft and said drive casing for driving said accessory in unison with said crankshaft, and said actuating means braking said reaction sun gear to a fixed reference frame of said motor vehicle at a prescribed speed condition of said vehicle so that said gear set means drives said drive casing in reaction to said reaction sun gear to form a reduced speed drive between said drive casing and said crankshaft for driving said accessory at a prescribed reduced speed ratio to said crankshaft and in the same direction as said crankshaft.

11. The device of claim 10 wherein said actuation means includes an overrunning clutch connecting said reaction sun gear and drive casing for creating said direct drive when said reaction sun gear is not braked and a freewheeling drive when said reaction sun gear is braked.

12. The device of claim 11 wherein said actuation means includes a braking member fixed to said reference frame and a braked member fixably carried by said reaction sun gear, said braking member acting on said braked member to hold said braked member and said reaction sun gear stationary.

13. The device of claim 12 wherein said braked member includes a disc carried by said reaction sun gear.

14. The device of claim 12 wherein said means includes means for sensing the speed of said vehicle to activate said brake.

15. The device of claim 10 wherein said gear set includes an idler gear meshing with said input sun gear and a compound planet having a first gear meshing with said idler gear and a second gear meshing with said reaction sun gear.

16. The device of claim 10 wherein said circumference of said casing includes drive belt grooves.

17. In a motor vehicle, a method of driving at least one accessory from an engine of the motor vehicle at a reduced speed relative to a crankshaft of the engine comprising in combination:

driving an input sun gear directly by said crankshaft;

carrying a reaction sun gear concentric with said crankshaft and for relative rotation with said crankshaft;

carrying a gear set which interconnects said input sun gear and reaction sun gear in a drive casing; and clutching said reaction sun gear and said drive casing to form a direct drive for between said crankshaft and drive casing for driving said accessory in unison with said crankshaft over a first engine speed range, and braking said reaction sun gear against rotation to form a reduced speed drive for driving said drive casing from said crankshaft in the same direction as said crankshaft and at a reduced speed over a second vehicle speed range.

18. The method of claim 17 including braking said reaction sun gear against a fixed reference frame of said vehicle.

19. The method of claim 17 including carrying said compound planet rotatably in said drive casing for rotation with said drive casing in a manner that said gear set rotates in reaction to said reaction sun gear in said reduced drive, and said crankshaft, input sun gear, gear set, reaction sun gear, and said drive casing rotate in unison in said drive at drive.

20. The method of claim 17 including in said gear set, a pair of planet gears, a first of said planet gears meshing with an idler gear which meshes with said input sun gear, and a second of said planet gears which meshes with said reaction sun gear.

* * * * *